United States Patent
Joung

(10) Patent No.: US 6,783,399 B2
(45) Date of Patent: Aug. 31, 2004

(54) UNIVERSAL SLOT FOR ACCOMMODATING VARIOUS TYPES OF FLASH MEMORY CARDS

(75) Inventor: Ii-Kweon Joung, Ansan-si (KR)

(73) Assignee: Samsung Electro-Mechanics Co., LTD, Kyunggi-Do (KR)

( * ) Notice: Subject to any disclaimer, the term of this patent is extended or adjusted under 35 U.S.C. 154(b) by 0 days.

(21) Appl. No.: 10/447,340

(22) Filed: May 28, 2003

(65) Prior Publication Data

US 2004/0038574 A1 Feb. 26, 2004

(30) Foreign Application Priority Data

Aug. 23, 2002 (KR) ........................................ 2002-50057

(51) Int. Cl.⁷ ............................................. H01R 24/00
(52) U.S. Cl. ..................................... 439/630; 361/737
(58) Field of Search ...................... 361/737; 439/541.5, 439/630, 137, 138, 64, 218

(56) References Cited

U.S. PATENT DOCUMENTS

| | | | | |
|---|---|---|---|---|
| 4,857,005 A | * | 8/1989 | Kikuchi et al. | 439/140 |
| 6,097,605 A | * | 8/2000 | Klatt et al. | 361/737 |
| 6,386,920 B1 | * | 5/2002 | Sun | 439/630 |
| 6,402,529 B2 | * | 6/2002 | Saito et al. | 439/74 |
| 6,482,029 B2 | * | 11/2002 | Nishimura | 439/541.5 |
| 6,524,137 B1 | * | 2/2003 | Liu et al. | 439/638 |
| 6,612,492 B1 | * | 9/2003 | Yen | 235/451 |
| 6,659,802 B1 | * | 12/2003 | Lwee | 439/630 |
| 6,672,904 B1 | * | 1/2004 | Chen | 439/631 |
| 6,699,053 B2 | * | 3/2004 | Kuroda | 439/218 |
| 6,716,066 B1 | * | 4/2004 | Kuo | 439/630 |
| 2003/0095194 A1 | * | 5/2003 | Suzuki et al. | 348/231.99 |
| 2003/0095386 A1 | * | 5/2003 | Le et al. | 361/737 |
| 2003/0235040 A1 | * | 12/2003 | Lui et al. | 361/737 |
| 2004/0058585 A1 | * | 3/2004 | Nagata | 439/630 |

FOREIGN PATENT DOCUMENTS

JP     2000-350741     5/2002

* cited by examiner

Primary Examiner—Tho D. Ta
Assistant Examiner—Larisa Tsukerman
(74) Attorney, Agent, or Firm—Gottlieb, Rackman & Reisman, P.C.

(57) ABSTRACT

A slot with a modified case to accommodate various types of flash memory cards having different sizes is disclosed. The slot includes a slot case divided into upper and lower spaces, and having an insert hole at its front face, a door being opened when the flash memory card is inserted into the insert hole, an elastic element for biasing the door to be closed, first insert guide faces for directing the flash memory card into the lower space, second insert guide faces positioned behind the first insert guide faces to guide the flash memory card passed over the first insert guide faces, slide faces for directing the flash memory card into the upper space, a plurality of insert guides into which the flash memory card inserted along the first and second insert guide faces and the slide faces are fitted, and a plurality of electrodes including contacts corresponding to pins of the flash memory card fitted in the plurality of insert guides.

25 Claims, 8 Drawing Sheets

Fig. 3
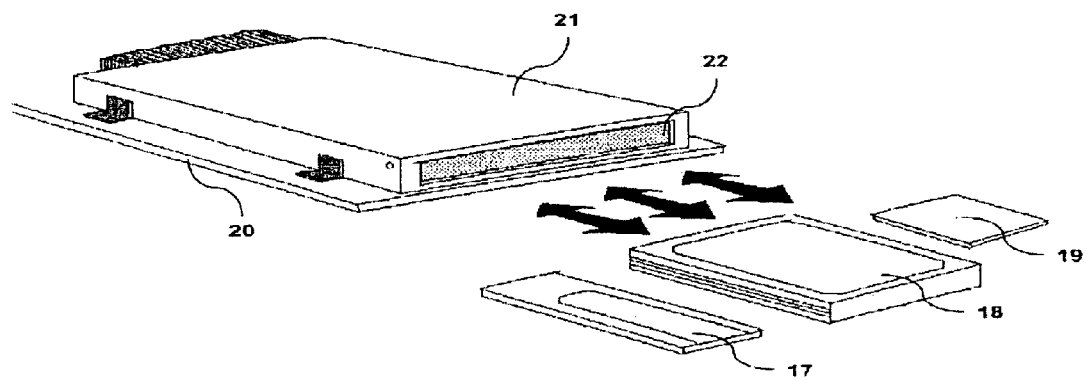
Fig. 4-a
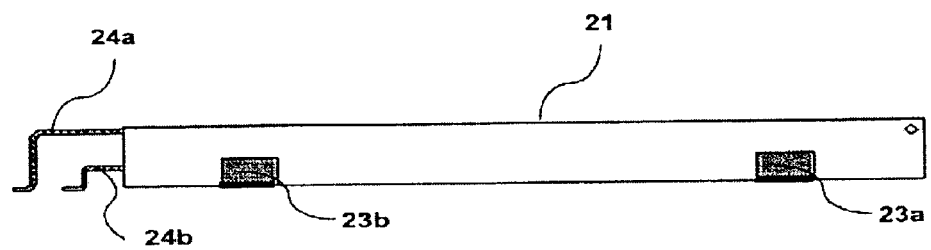
Fig. 4-b
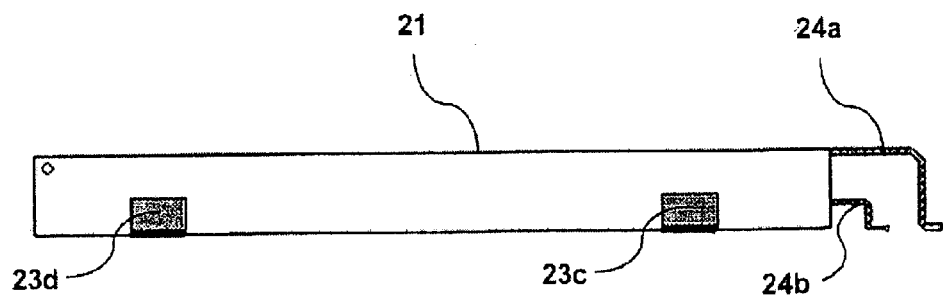

Fig. 5-b

Fig. 5-c
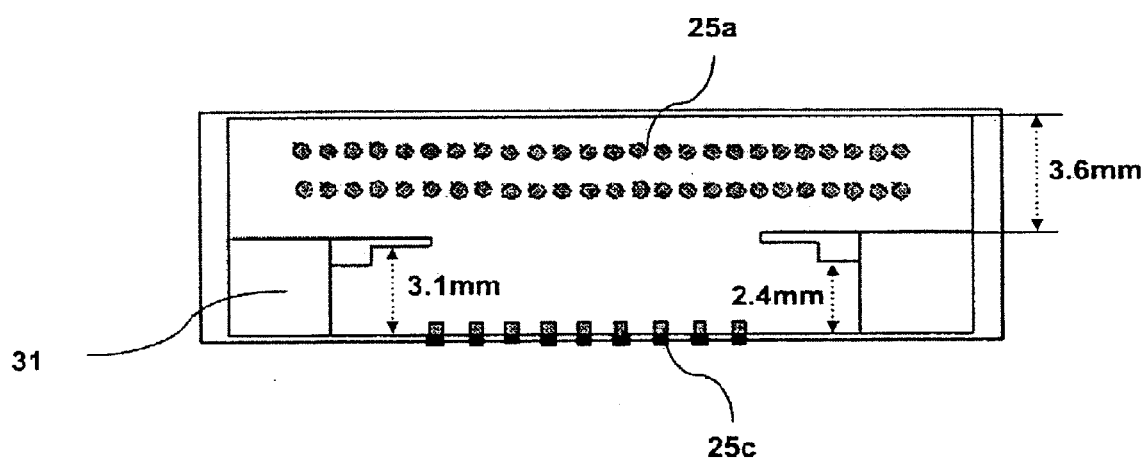
Fig. 6
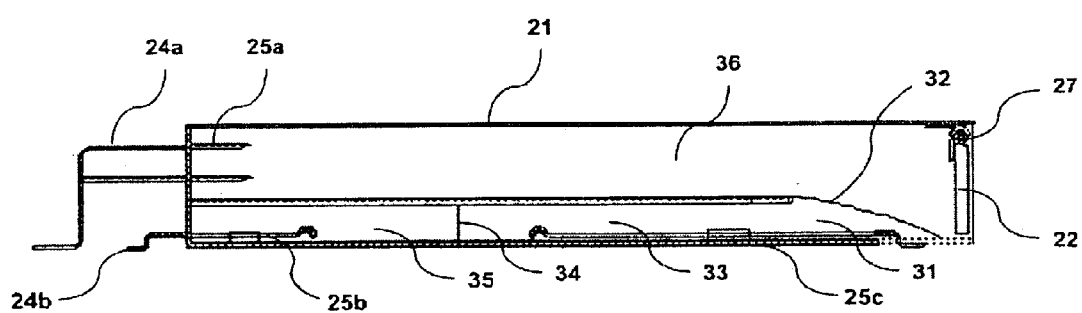

Fig. 7
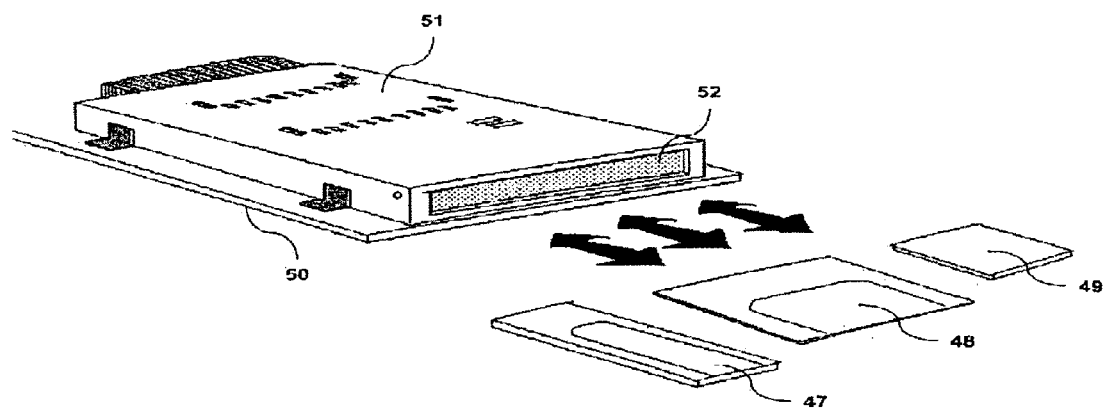
Fig. 8-a
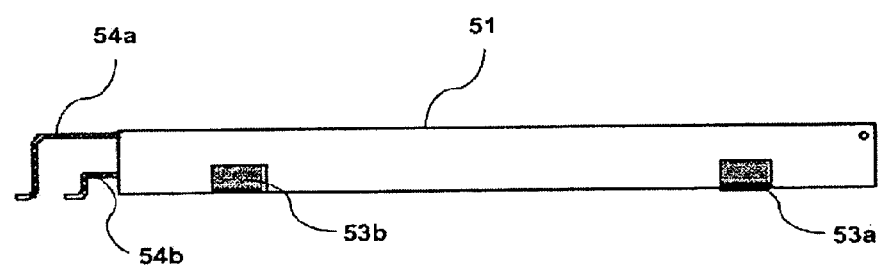
Fig. 8-b
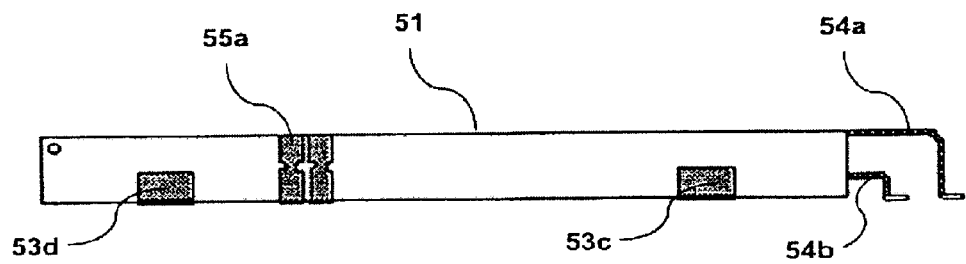

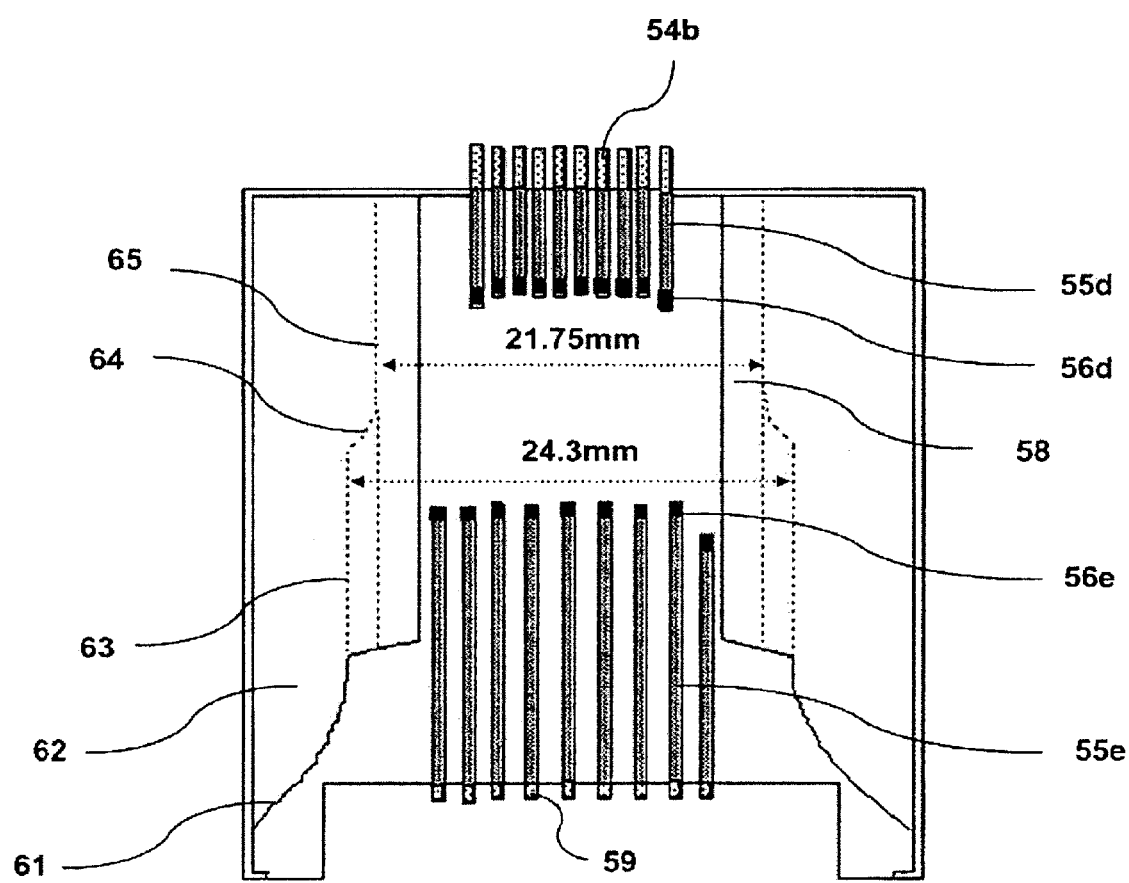
Fig. 9-a

Fig. 9-b
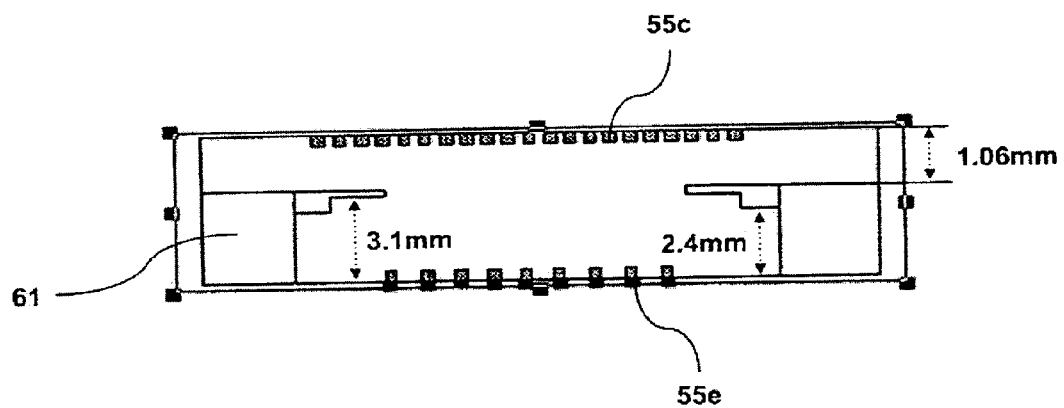
Fig. 10
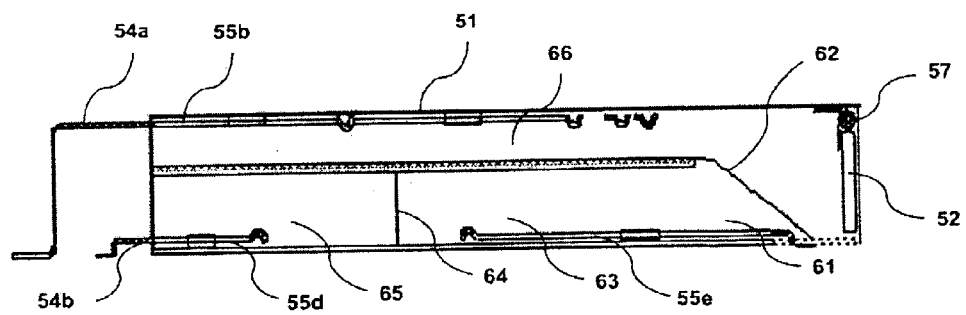

UNIVERSAL SLOT FOR ACCOMMODATING VARIOUS TYPES OF FLASH MEMORY CARDS

BACKGROUND OF THE INVENTION

1. Field of the Invention

The present invention relates to a universal slot for accommodating various types of flash memory cards, and more particularly to a universal slot for accommodating various types of flash memory cards, which is changed in its case structure so as to allow various types of flash memory cards having different sizes to be inserted thereinto.

2. Description of the Prior Art

In general, a flash memory is referred to as a flash EEPROM, which is developed by combining advantages of two types of semiconductor memory devices, i.e., EPROM and EEPROM. The flash memory is a highly-integrated non-volatile memory device, which allows erasure of data stored therein and is reprogrammable.

To use such a flash memory card, there is need to provide a storage device, which utilizes personal computers as well as electronic home appliances, as platforms. As various storage devices based on flash memory have been developed in recent years, various applied electronic appliances such as digital cameras, MP3 players, PDAs, printers and keyboards, which are adapted to adopt such flash memories, have become commercially available.

As this kind of flash memory cards, approximately six types of flash memory cards are commercially available at the present day. Although all the six types of flash memory cards are memory devices based on a flash memory, the flash memory cards are different in their shapes and sizes, and techniques to mount the flash memory cards on the appliances are also different. Hence, the manufacturers of the six types of flash memory cards are cultivating their respective markets. However, it is difficult to realize the standardization of the flash memory cards under current conditions, and electronic appliances such as digital cameras, MP3 players and PDAs adopt different types of flash memory cards.

Accordingly, a demand for a product for accommodating all the types of flash memory cards is gradually increased. To accommodate many types of flash memory cards, it is necessary to provide the number of slots corresponding to the number of the types of the flash memory cards. As a result, since all the flash memory cards are different in the number and the position of their pins, their size and so on, there is a limit to miniaturization of the size of the products.

Conventional examples of inserting various flash memory cards into the corresponding slots are now described with reference to FIGS. 1 and 2.

FIG. 1 shows an example of inserting five types of flash memory cards into three slots, and FIG. 2 shows an example of inserting four types of flash memory cards into three slots.

In an example shown in FIG. 1, a Memory Stick 17, a CompactFlash card or a Micro Drive 18 and a Secure Digital or a MultiMedia card 19 are inserted into card holes 14, 15 and 16 of a slot 11 for Memory Stick, a slot 12 for CompactFlash card or Micro Drive and a slot 13 for Secure Digital or MultiMedia card, all of which are mounted on a printed circuit board 10 of a storage device. In this example, the CompactFlash card or the Micro Drive 18 may be inserted into only one slot, and the Secure Digital or the MultiMedia card 19 may also be inserted into only one slot.

In an example shown in FIG. 2, a Memory Stick 47, a SmartMedia card 48 and a Secure Digital or a MultiMedia card 49 are inserted into card holes 44, 45 and 46 of a slot 41 for Memory Stick, a slot 42 for SmartMedia card and a slot 43 for Secure Digital or MultiMedia card, all of which are mounted on a printed circuit board 40 of a storage device. In this example, the Secure Digital or the MultiMedia card 49 may be inserted into only one slot. Since the CompactFlash card or the Micro Drive 18 shown in FIG. 1 and the SmartMedia card 48 shown in FIG. 2 are different in width and thickness, the two types of cards must be used in different slots.

That is, to utilize the six types of commercially available flash memory cards together, at least four slots must be provided. More specifically, to utilize six types of flash memory cards, i.e., a Memory Stick, a CompactFlash card, a Micro Drive, a Secure Digital, a MultiMedia card and a SmartMedia card, in one storage device, which is adapted to write on and read data from the flash memory cards, the storage device must be provided with dedicated slots of the six types of flash memory cards.

A conventional small-sized memory card connector is disclosed in Japanese Patent Laid-open No. 2002-158068. More specifically, the Patent discloses a small-sized memory card connector which allows a compact memory card to be freely inserted into a casing and then to be connected thereto, comprising: a plurality of terminal parts provided at different positions in the casing, each of which is adapted to be connected to a corresponding one of various memory cards; a sensor for detecting a type of a memory card inserted into the casing; and a stopper for positioning the memory card to a corresponding terminal part according to the detection by the sensor.

However, the memory card connector of the Patent has a disadvantage in that it is difficult to detect a type of an arbitrary memory card where the sensor does not include a switch for detecting a width of the memory card and a switch for detecting a thickness of the memory card. In addition, the memory card connector must have the stopper to position the memory card according to the detection result. The stopper is adapted to be protruded or pushed according to the detection result of the sensor, so as to stop the inserted memory card to a certain position. At this point, since the stopper is not fixed but moved by insertion of the memory card, there is a complication in its structure and a limit to its movement. That is, the stopper is pushed laterally when a long and slim memory card is inserted into the slot, while the stopper is protruded again when the memory card is pulled out of the slot. Accordingly, since the stopper is moved by insertion of the memory card, the slot is apt to be damaged. In addition, it is complicated to install the stopper in the slot. Malfunction of the stopper causes the memory card not to be inserted into the slot.

SUMMARY OF THE INVENTION

Accordingly, the present invention has been made keeping in mind the above problems occurring in the prior art, and an object of the present invention is to provide a universal slot for accommodating any of various types of flash memory cards.

Another object of the present invention is to provide a universal slot for accommodating various types of flash memory cards, which is changed in its case structure so as to allow any of various types of flash memory cards having different sizes to be firmly inserted thereinto.

In order to accomplish the above object, the present invention provides a universal slot for accommodating any of various types of flash memory cards, comprising: a slot case divided into upper and lower spaces, and having an insert hole at its front face; a door provided at the insert hole, which is opened when the flash memory card is inserted into the insert hole; an elastic element for biasing the door to be closed; slide faces for directing the flash memory card into the upper space of the slot case; a plurality of insert guides with first and second insert guide faces into which the flash memory card inserted along the first and second insert guide faces and the slide faces is fitted, wherein, the first insert guide faces direct the flash memory card into the lower of the slot case and the second insert guide faces are provided at the inner position of the first insert guide faces to guide the flash memory card passed through the first insert guide faces; and a plurality of electrodes including contacts corresponding to pins of the flash memory card fitted in the plurality of insert guides.

The second insert guide faces may serve as blocking faces for preventing further ingression of the flash memory card when the flash memory card passed over the first insert guide faces are fitted into the insert guide.

The width defined between the second insert guide faces may be set to be smaller than the width defined between the first insert guide faces.

The first and second insert guide faces may be rounded to slope inwardly, and the slide faces may be rounded to slope upwardly.

The slot case, the first and second guide faces, the slide faces and the plurality of insert guides may be integrally molded.

The universal slot may further include card-holding portions, which are integrally molded to be extended from the insert guides and serve to support the inserted flash memory card.

The flash memory card, which is loaded into the slot along the slide faces, may be a CompactFlash card or a Micro Drive.

The flash memory card, which is loaded into the slot along the slide faces, may be a SmartMedia card.

The flash memory card, which is loaded into the slot along only the first insert guide faces, may be a Secure Digital or a MultiMedia card.

The flash memory card, which is loaded into the slot along the second insert guide faces, may be a Memory Stick.

According to another aspect of the present invention, the present invention provides a universal slot for accommodating any of five types of flash memory cards including a CompactFlash card, a Micro Drive, a Secure Digital, a MultiMedia card and a Memory Stick, comprising: a slot case divided into upper and lower spaces, and having an insert hole at its front face; a door provided at the insert hole, which is opened when any of the flash memory cards is inserted into the insert hole; an elastic element for biasing the door to be closed; slide faces for directing the CompactFlash card or the Micro Drive of the flash memory cards into the upper space of the slot case; a plurality of insert guides with first and second insert guide faces into which the flash memory cards inserted along the first and second insert guide faces and the slide faces are fitted, wherein, the first insert guide faces direct the Secure Digital, the MultiMedia card or the Memory Stick of the flash memory cards into the lower space of the slot case and the second insert guide faces are provided at the inner position of the first insert guide faces to guide the Memory Stick passed through the first insert guide faces; and a plurality of electrodes including contacts corresponding to pins of the flash memory cards fitted in the plurality of insert guides.

According to a further aspect of the present invention, the present invention provides a universal slot for accommodating any of four types of flash memory cards including a SmartMedia card, a Secure Digital, a MultiMedia card and a Memory Stick, comprising: a slot case divided into upper and lower spaces, and having an insert hole at its front face; a door provided at the insert hole, which is opened when any of the flash memory cards is inserted into the insert hole; an elastic element for biasing the door to be closed; a plurality of insert guides with first and second insert guide faces into which the flash memory cards inserted along the first and second insert guide faces and the slide faces are fitted, wherein, the first insert guide faces direct the Secure Digital, the MultiMedia card or the Memory Stick of the flash memory cards into the lower space of the slot case and the second insert guide faces are provided at the inner position of the first insert guide faces to guide the Memory Stick passed through the first insert guide faces; and a plurality of electrodes including contacts corresponding to pins of the flash memory cards fitted in the plurality of insert guides.

Accordingly, the present invention enables only one slot to accommodate four types of flash memory cards including SmartMedia card, a Secure Digital, a MultiMedia card and a Memory Stick or to accommodate five types of flash memory cards including CompactFlash card, a Micro Drive, a Secure Digital, a MultiMedia card and a Memory Stick. According to the present invention, since four or five types of flash memory cards can be accommodated by one slot of the present invention, without providing their corresponding slots, the products can be made compact and can be manufactured at a low production cost.

BRIEF DESCRIPTION OF THE DRAWINGS

The above and other objects, features and advantages of the present invention will be more clearly understood from the following detailed description taken in conjunction with the accompanying drawings, in which:

FIG. 3 is a perspective view of a universal slot according to the first example of the present invention, in which five types of flash memory cards are inserted into the slot;

FIG. 6 is a cross-sectional view of the universal slot according to the first example of the present invention;

FIG. 7 is a perspective view of the universal slot according to the second example of the present invention, in which four types of flash memory cards are inserted into the slot;

FIGS. 8a and 8b are a left side view and a right side view of the universal slot according to the second example of the present invention;

FIGS. 9a and 9b are a top plan view and a bottom plan view of the universal slot according to the second example of the present invention;

FIG. 9c is a front elevation view of the universal slot according to the second example of the present invention, in which the door is removed; and FIG. 10 is a cross-sectional view of the universal slot according to the second example of the present invention.

DETAILED DESCRIPTION OF THE INVENTION

A universal slot for accommodating any of various types of flash memory cards according to the present invention will be described in further detail by way of example with reference to the accompanying drawings.

Though the universal slot according to the present invention is designed to accommodate various types of flash memory cards, which are different in size, the universal slot includes only one insert hole, which is provided at a front face of the slot and has a certain size. The universal slot according to the present invention further includes a door, upper and lower electrodes, guide faces for guiding insertion of various types of flash memory cards, and a slide face for guiding insertion of flash memory cards.

The universal slot according to the present invention is mounted on a printed circuit board, and is provided at its front face with an insert hole. The door is supported by a spring having a pin therethrough, which electrically biases the door in a direction of closing the slot. The configuration of the door and the spring is similar to that of a usual 3.5-inch floppy disc drive.

Therefore, the door is opened when any of various types of flash memory cards is inserted into the slot, while the door is closed by the spring when the flash memory card is pulled out of the slot. Since the door is provided with the spring, the door pushes the flash memory card downward when the memory card is inserted into the slot. This enables the flash memory card to be stably and exactly inserted into the slot. Accordingly, even when a flash memory card smaller than the insert hole of the slot case is inserted, the flash memory card can be stably and exactly inserted into the slot.

FIRST EXAMPLE

A universal slot for accommodating five types of flash memory cards according to a first example of the present invention will now be described with reference to FIGS. 3 to 6.

FIG. 3 is a perspective view of the universal slot according to the first example of the present invention, in which five types of flash memory cards are inserted into the slot. FIGS. 4a and 4b are a left side view and a right side view of the universal slot according to the first example of the present invention.

Figure 1:
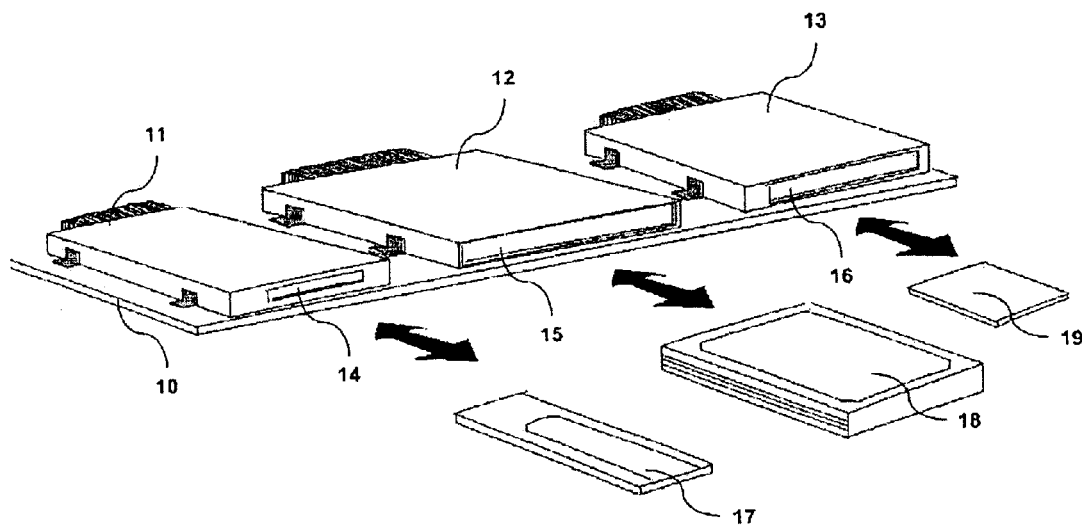
FIG. 1 is a perspective view showing a conventional example of inserting five types of flash memory cards into three slots.
Figure 2:
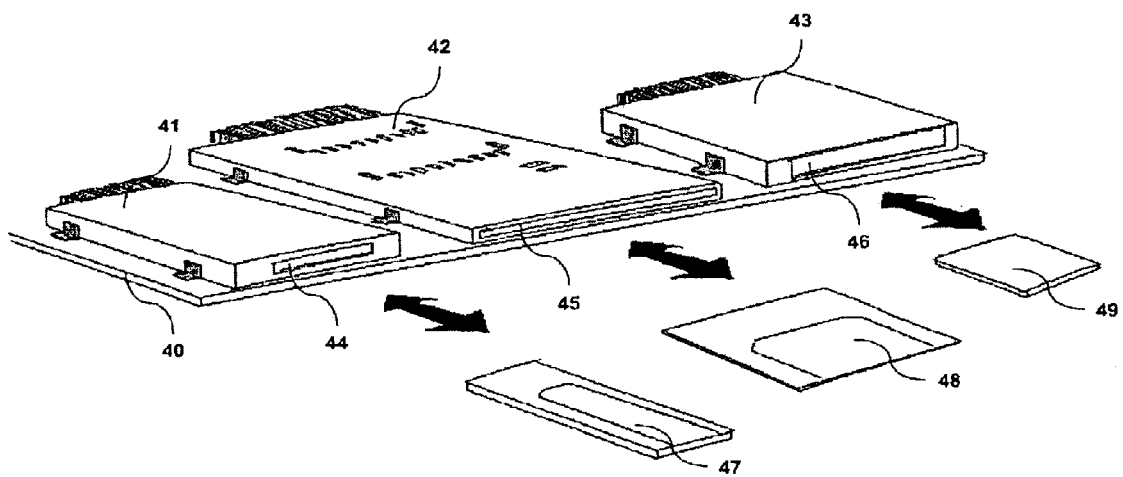
FIG. 2 is a perspective view showing a conventional example of inserting four types of flash memory cards into three slots.
Figure 4:
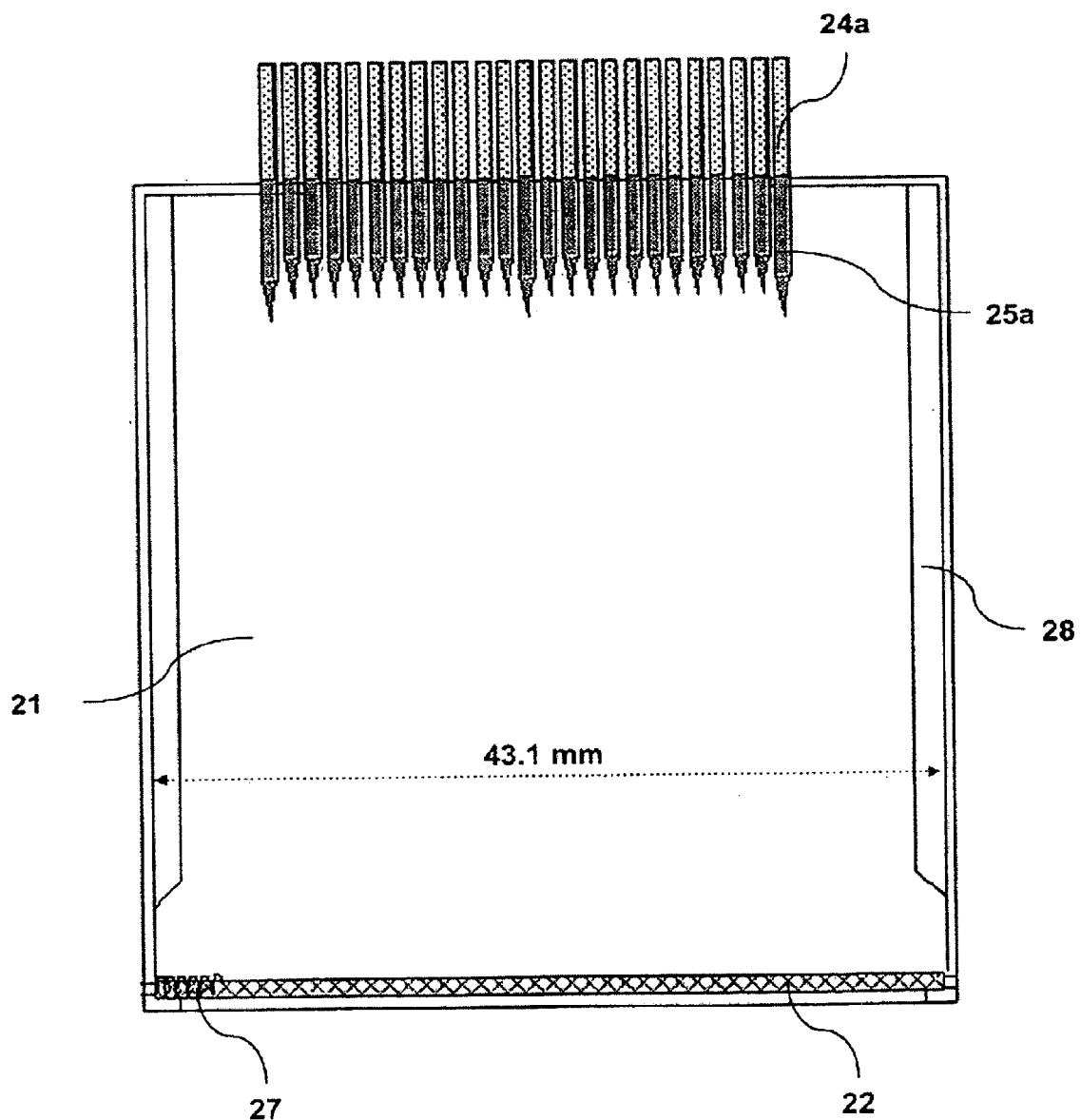
FIGS. 4a and 4b are a left side view and a right side view of the universal slot according to the first example of the present invention.
Figure 5:
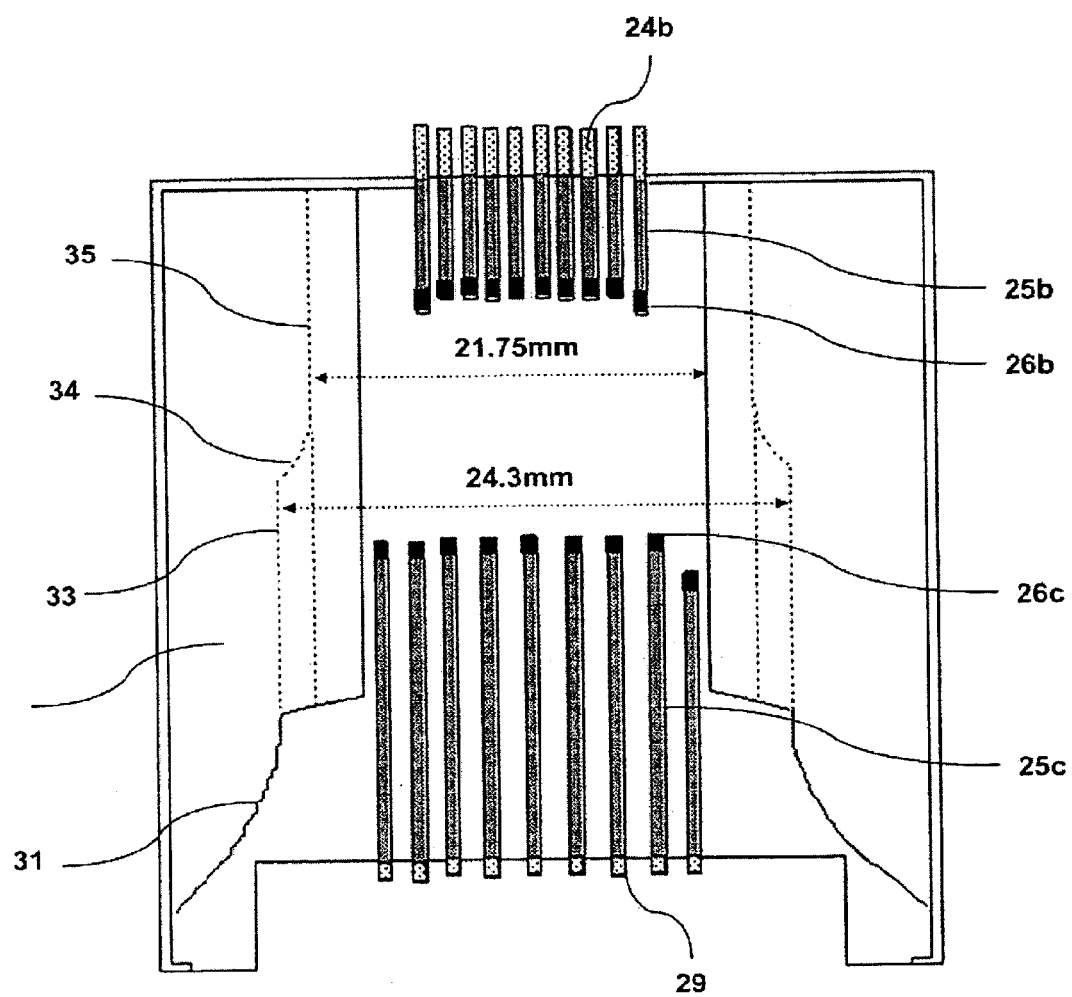
FIGS. 5a and 5b are atop plan view and a bottom plan view of the universal slot according to the first example of the present invention.
FIG. 5c is a front elevation view of the universal slot according to the first example of the present invention, in which the door is removed.

As shown in FIGS. 3 to 4b, the universal slot according to this example can accommodate flash memory cards having three sizes, i.e., five types of flash memory cards 17, 18 and 19 through a door 22. In the universal slot, terminals 24a and 24b are soldered to a printed circuit board, and support pieces 23a and 23b serve to fix the universal slot on the printed circuit board.

FIGS. 5a and 5b are a top plan view and a bottom plan view of the universal slot according to the first example of the present invention, and FIG. 5c is a front elevation view of the universal slot, in which the door is removed.

As shown in FIGS. 5a to 5c, the universal slot according to the first example of the present invention, which is intended to accommodate any of five types of flash memory cards such as a Memory Stick 17, a CompactFlash card or a Micro Drive 18 and a Secure Digital or a MultiMedia card 19, includes a slot case 21 divided into an upper space and a lower space and having an insert hole at its front face, a door 22 provided at the insert hole, which is opened when any one of the flash memory cards 17, 18 and 19 is inserted into the insert hole, a spring 27 for biasing the door to be closed, first insert guide faces 31 for directing a Memory Stick 17 or a Secure Digital or a MultiMedia card 19 into the lower space of the slot case 21, second insert guide faces 34 provided at a rear position of the first insert guide faces 31 to guide a Memory Stick 17 passed over the first insert guide faces 31, slide faces 32 for directing a CompactFlash card or a Micro Drive 18 into the upper space of the slot case 21, a plurality of insert guides 28, 33 and 35 into which flash memory cards 17, 18 and 19 inserted along the first and second insert guide faces 31 and 34 and the slide faces 32 are fitted, and a plurality of electrodes 25a, 25b and 25c including contacts 26b and 26c corresponding to pins of the flash memory cards 17, 18 and 19 fitted in the plurality of insert guides 28, 33 and 35.

The second insert guide faces 34 serve as blocking faces for preventing further ingression of the flash memory card 17 or 19 when the flash memory card 17 or 19 passed over the first insert guide faces 31 is fitted into the insert guide 33.

The width defined between inner ends of the second insert guide faces 34 must be smaller than the width defined between inner ends of the first insert guide faces 31. In other words, the width (21.75 mm) defined between the second insert guide faces 34, which is adapted to receive a Memory Stick 17, is smaller than the width (24.3 mm) defined between the first insert guide faces 31, which is adapted to receive a Secure Digital or a MultiMedia card 19.

The first and second insert guide faces 31 and 34 are rounded to slope inwardly, and the slide faces 32 are rounded to slope upwardly.

The slot case 21, the first and second guide faces 31 and 34, the slide faces 32 and the plurality of insert guides 28, 33 and 35 are integrally molded.

The universal slot according to this example further may include card-holding portions, which are integrally molded to be extended from the insert guides 33 and 35 and serve to support inserted flash memory cards 17 or 19.

Terminals 24a, 24b and 29 are soldered to a printed circuit board.

In dimension of the flash memory cards, a CompactFlash card or a Micro Drive 18 is sized to have a width of 43.1 mm and a thickness of 3.6 mm, a Secure Digital or a MultiMedia card 19 is sized to have a width of 24.3 mm and a thickness of 2.4 mm, and a Memory Stick 17 is sized to have a width of 21.7 mm and a thickness of 3.1 mm. Therefore, the universal slot according to the present invention is configured in consideration of the above size of the flash memory cards.

FIG. 6 is a cross-sectional view of the universal slot according to the first example of the present invention. An operation of loading each of the flash memory cards into the universal slot of the present invention will now described with reference to FIG. 6.

First, an operation of loading a relatively small Secure Digital or a MultiMedia card 19 is described. When the flash memory card 19 is inserted into the insert hole of the slot case, the flash memory card 19 is guided toward the center of the slot by the first insert guide faces 31 even though the flash memory card is deviated from the center.

Accordingly, the flash memory card 19 is correctly positioned between the first guides 33. Thereafter, the flash memory 19 is stopped by the second guide faces 34, and is firmly held in place by the card-holding portions. The electrodes 25c of the flash memory card 19 come into contact with the first contacts 26c, thereby completing connection of the flash memory card 19.

When the Memory Stick 17 is loaded into the universal slot according to the present invention, the flash memory card 17 is first inserted along the first insert guide 33 and then inserted between the second insert guides 35 by the guidance of the second guide faces 34. When the flash memory card 17 is completely inserted into the slot, the electrodes of the Memory Stick 17 come into contact with the contacts 26b, thereby completing the connection of the Memory Stick 17.

In a loading operation of a CompactFlash card or a Micro Drive 18, the flash memory card is raised along the slide faces 32 without insertion along the first insert guide faces 31, because the width of the CompactFlash card or Micro Drive 18 is larger than that of other flash memory card 17 or 19. Consequently, the flash memory card 18 is inserted into the upper space of the slot case 21. When the insertion of the CompactFlash card or Micro Drive 18 is completed, the electrodes of the CompactFlash card or Micro Drive 18 are connected to the corresponding contacts.

SECOND EXAMPLE

A universal slot for accommodating four types of flash memory cards according to a second example of the present invention will now be described with reference to FIGS. 7 to 10.

FIG. 7 is a perspective view of the universal slot according to the second example of the present invention, in which four types of flash memory cards are inserted into the slot. FIGS. 8a and 8b are a left side view and a right side view of the universal slot according to the second example of the present invention.

As shown in FIGS. 7 to 8b, the universal slot according to this example can accommodate flash memory cards having three sizes, i.e., four types of flash memory cards 47, 48 and 49 through a door 52. In the universal slot, terminals 54a and 54b are soldered to a printed circuit board, and support pieces 53a and 53b serve to fix the universal slot on the printed circuit board.

FIGS. 9a and 9b are a top plan view and a bottom plan view of the universal slot according to the second example of the present invention, and FIG. 9c is a front elevation view of the universal slot, in which the door is removed.

As shown in FIGS. 9a to 9c, the universal slot according to the second example of the present invention, which is intended to accommodate any of four types of flash memory cards such as a Memory Stick 47, a SmartMedia card 48 and a Secure Digital or a MultiMedia card 49, includes a slot case 51 divided into an upper space and a lower space and having an insert hole at its front face, a door 52 provided at the insert hole, which is opened when any one of the flash memory cards 47, 48 and 49 is inserted into the insert hole, a spring 57 for biasing the door to be closed, first insert guide faces 61 for directing a Memory Stick 47 or a Secure Digital or a MultiMedia card 49 into the lower space of the slot case 51, second insert guide faces 64 provided at a rear position of the first insert guide faces 61 to guide a Memory Stick 47 passed over the first insert guide faces 61, slide faces 62 for directing a SmartMedia card 48 into the upper space of the slot case 51, a plurality of insert guides 63 and 65 into which flash memory cards 47, 48 and 49 inserted along the first and second insert guide faces 61 and 64 and the slide faces 62 are fitted, and a plurality of electrodes 55a, 55b, 55c, 55d and 55e including contacts 56a, 56b, 56c, 56d and 56e corresponding to pins of the flash memory cards 47, 48 and 49 fitted in the plurality of insert guides 63 and 65.

The second insert guide faces 64 serve as blocking faces for preventing further ingression of flash memory card 49 when the flash memory card 49 passed over the first insert guide faces 61 are fitted into the insert guide 63.

The width defined between inner ends of the second insert guide faces 64 is set to be smaller than the width defined between inner ends of the first insert guide faces 61.

The first and second insert guide faces 61 and 64 are rounded to slope, inwardly, and the slide faces 62 are rounded to slope upwardly.

The slot case 51, the first and second guide faces 61 and 64, the slide faces 62 and the plurality of insert guides 63 and 65 are integrally molded.

The universal slot according to this example may further include card-holding portions 58, which are integrally molded to be extended from the first and second insert guide faces 61 and 64 and serve- to support inserted flash memory cards 47 or 49. Consequently, when a flash memory card 47 or 49, which is smaller than the insert hole of the slot case 51, is loaded, the flash memory card can be stably and exactly loaded.

Terminals 54a, 54b and 59 are soldered to a printed circuit board.

In dimension of the flash memory cards, a SmartMedia card 48 is sized to have a width of 37.3 mm and a thickness of 1.06 mm, a Secure Digital or a MultiMedia card 49 is sized to have a width of 24.3 mm and a thickness of 2.4 mm, and a Memory Stick 47 is sized to have a width of 21.7 mm and a thickness of 3.1 mm. Therefore, the universal slot according to the present invention is configured in consideration of the above size of the flash memory cards.

FIG. 10 is a cross-sectional view of the universal slot according to the second example of the present invention. An operation of loading each of the flash memory cards into the universal slot of the present invention will now be described with reference to FIG. 10.

First, an operation of loading a relatively small Secure Digital or a MultiMedia card 49 is described. When the flash memory card 49 is inserted into the insert hole of the slot case 51, the flash memory card 49 is guided toward the center of the slot by the first insert guide faces 61 even though the flash memory card is deviated from the center.

Accordingly, the flash memory card 19 is correctly positioned between the first guides 63. Thereafter, the flash memory 49 is stopped by the second guide faces 64, and is firmly held in place by the card-holding portions 58. The electrodes of the flash memory card 49 come into contact with the first contacts 56c, thereby completing connection of the flash memory card 49.

When the Memory Stick 47 is loaded into the universal slot according to the present invention, the flash memory card 47 is first inserted along the first insert guide 63 and then inserted between the second insert guides 65 by the guidance of the second guide faces 64. When the flash memory card 47 is completely inserted into the slot, the electrodes of the Memory Stick 47 come into contact with the contacts 56d, thereby completing the connection of the Memory Stick 47.

In a loading operation of a SmartMedia card 48, the flash memory card is raised along the slide faces 62 without insertion along the first insert guide faces 61, because the width of the SmartMedia card 48 is larger than that of other flash memory card 47 or 49. Consequently, the flash memory card 48 is inserted into the upper space of the slot case 51. When the insertion of the SmartMedia card 48 is completed, the electrodes of the SmartMedia card 48 are connected to the corresponding contacts.

As described above, the present invention enables various types of flash memory cards to be connected to a storage device through only one slot. Since the slot case, the first and second guide faces, the slide faces and the plurality of insert guides are integrally molded, a flash memory card can be firmly and stably held in the slot.

Since the slot according to the present invention can accommodate various types of flash memory cards by change of its slot case without utilization of corresponding dedicated slots, products adopting the slot can be made compact, and can be manufactured at low production cost.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A universal slot for accommodating any of various types of flash memory cards, comprising:
    a slot case divided into upper and lower spaces, and having an insert hole at its front face;
    a door provided at the insert hole, which is opened when the flash memory card is inserted into the insert hole;
    an elastic element for biasing the door to be closed;
    slide faces for directing the flash memory card into the upper space of the slot case;
    a plurality of insert guides with first and second insert guide faces into which the flash memory card inserted along the first and second insert guide faces and the slide faces is fitted, wherein, the first insert guide faces direct the flash memory card into the lower of the slot case and the second insert guide faces are provided at the inner position of the first insert guide faces to guide the flash memory card passed through the first insert guide faces; and
    a plurality of electrodes having contacts corresponding to pins of the flash memory card fitted in the plurality of insert guides.

2. The universal slot as set forth in claim 1, wherein the second insert guide faces serve as blocking faces for preventing further ingression of the flash memory card when the flash memory card passed over the first insert guide faces are fitted into the insert guide.

3. The universal slot as set forth in claim 1, wherein the width defined between the second insert guide faces is set to be smaller than the width defined between the first insert guide faces.

4. The universal slot as set forth in claim 1, wherein the first and second insert guide faces are rounded to slope inwardly.

5. The universal slot as set forth in claim 1, wherein the slide faces are rounded to slope upwardly.

6. The universal slot as set forth in claim 1, wherein the slot case, the first and second guide faces, the slide faces and the plurality of insert guides are integrally molded.

7. The universal slot as set forth in claim 1, further comprising card-holding portions, which are integrally molded to be extended from the insert guides and serve to support the inserted flash memory card.

8. The universal slot as set forth in claim 1, wherein the flash memory card, which is loaded into the slot along the slide faces, is a CompactFlash card or a Micro Drive.

9. The universal slot as set forth in claim 1, wherein the flash memory card, which is loaded into the slot along the slide faces, is a SmartMedia card.

10. The universal slot as set forth in claim 1, wherein the flash memory card, which is loaded into the slot along only the first insert guide faces, is a Secure Digital or a MultiMedia card.

11. The universal slot as set forth in claim 1, wherein the flash memory card, which is loaded into the slot along the second insert guide faces, is a Memory Stick.

12. A universal slot for accommodating any of five types of flash memory cards including a CompactFlash card, a Micro Drive, a Secure Digital, a MultiMedia card and a Memory Stick, comprising:
    a slot case divided into upper and lower spaces, and having an insert hole at its front face;
    a door provided at the insert hole, which is opened when any of the flash memory cards is inserted into the insert hole;
    an elastic element for biasing the door to be closed;
    slide faces for directing the CompactFlash card or the Micro Drive of the flash memory cards into the upper space of the slot case;
    a plurality of insert guides with first and second insert guide faces into which the flash memory cards inserted along the first and second insert guide faces and the slide faces are fitted, wherein, the first insert guide faces direct the Secure Digital, the MultiMedia card or the Memory Stick of the flash memory cards into the lower space of the slot case and the second insert guide faces are provided at the inner position of the first insert guide faces to guide the Memory Stick passed through the first insert guide faces; and
    a plurality of electrodes having contacts corresponding to pins of the flash memory cards fitted in the plurality of insert guides.

13. The universal slot as set forth in claim 12, wherein the second insert guide faces serve as blocking faces for preventing further ingression of the flash memory card when the flash memory card passed over the first insert guide faces are fitted into the insert guide.

14. The universal slot as set forth in claim 12, wherein the width defined between the second insert guide faces is set to be smaller than the width defined between the first insert guide faces.

15. The universal slot as set forth in claim 12, wherein the first and second insert guide faces are rounded to slope inwardly.

16. The universal slot as set forth in claim 12, wherein the slide faces are rounded to slope upwardly.

17. The universal slot as set forth in claim 12, wherein the slot case, the first and second guide faces, the slide faces and the plurality of insert guides are integrally molded.

18. The universal slot as set forth in claim 12, further comprising card-holding portions, which are integrally molded to be extended from the insert guides and serve to support the inserted flash memory card.

19. A universal slot for accommodating any of four types of flash memory cards including a SmartMedia card, a Secure Digital, a MultiMedia card and a Memory Stick, comprising:
    a slot case divided into upper and lower spaces, and having an insert hole at its front face;

a door provided at the insert hole, which is opened when any of the flash memory cards is inserted into the insert hole;

an elastic element for biasing the door to be closed;

slide faces for directing the SmartMedia card of the flash memory cards into the upper space of the slot case;

a plurality of insert guides with first and second insert guide faces into which the flash memory cards inserted along the first and second insert guide faces and the slide faces are fitted, wherein, the first insert guide faces direct the Secure Digital, the MultiMedia card or the Memory Stick of the flash memory cards into the lower space of the slot case and the second insert guide faces are provided at the inner position of the first insert guide faces to guide the Memory Stick passed through the first insert guide faces; and a plurality of electrodes including contacts corresponding to pins of the flash memory cards fitted in the plurality of insert guides.

20. The universal slot as set forth in claim 19, wherein the second insert guide faces serve as blocking faces for preventing further ingression of the flash memory card when the flash memory card passed over the first insert guide faces are fitted into the insert guide.

21. The universal slot as set forth in claim 19, wherein the width defined between the second insert guide faces is set to be smaller than the width defined between the first insert guide faces.

22. The universal slot as set forth in claim 19, wherein the first and second insert guide faces are rounded to slope inwardly.

23. The universal slot as set forth in claim 19, wherein the slide faces are rounded to slope upwardly.

24. The universal slot as set forth in claim 19, wherein the slot case, the first and second guide faces, the slide faces and the plurality of insert guides are integrally molded.

25. The universal slot as set forth in claim 19, further comprising card-holding portions, which are integrally molded to be extended from the insert guides and serve to support the inserted flash memory card.

* * * * *